July 22, 1952   M. KASTNER   2,604,378
METHOD OF MAKING DOUBLE SULFATE OF SODIUM AND
ZIRCONIUM AND PRODUCT RESULTING THEREFROM
Filed March 6, 1946
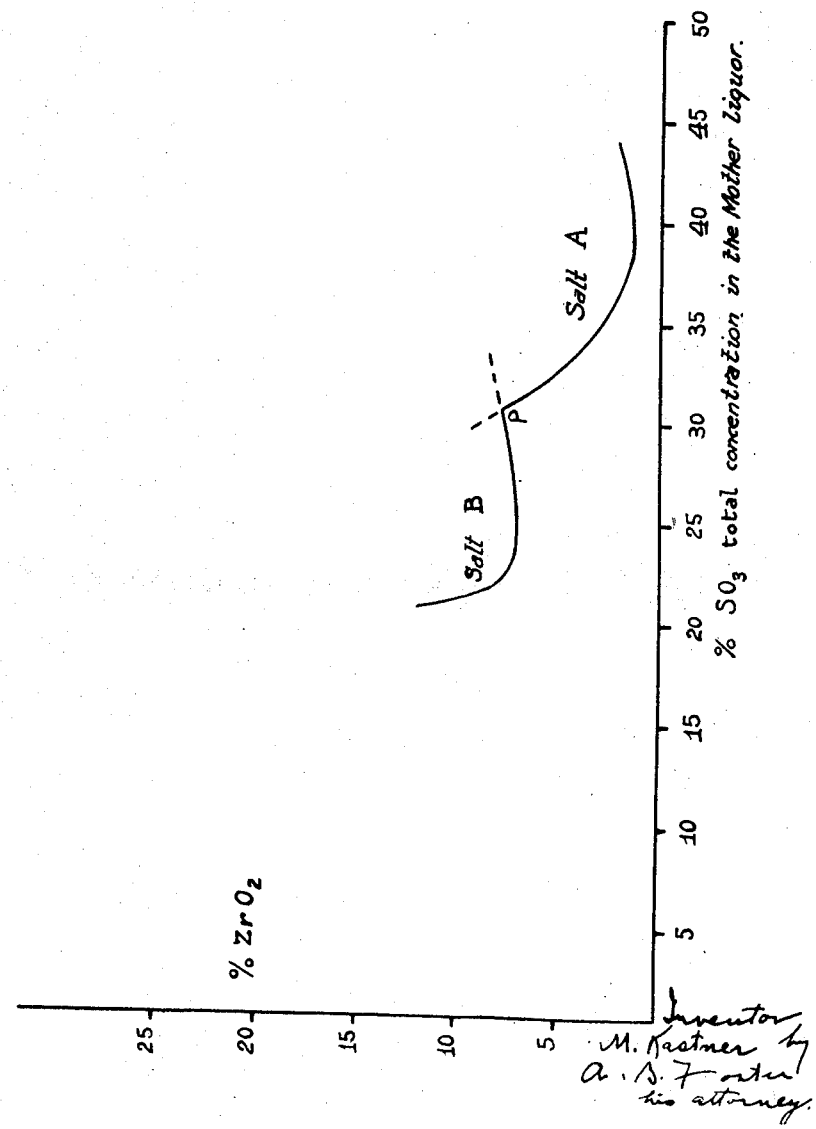
Inventor
M. Kastner by
A. B. Foster
his attorney.

Patented July 22, 1952

2,604,378

UNITED STATES PATENT OFFICE 2,604,378

METHOD OF MAKING DOUBLE SULFATE OF SODIUM AND ZIRCONIUM AND PRODUCT RESULTING THEREFROM

Marcel Kastner, Beaumontel, France, assignor to Societe de Produits Chimiques des Terres Rares, Paris, France Application March 6, 1946, Serial No. 652,458
In France May 11, 1944

Section 1, Public Law 690, August 8, 1946
Patent expires May 11, 1964

16 Claims. (Cl. 23—117)

Various methods have been described for obtaining industrially pure zirconium compounds from impure crude materials, such as zirconium ores. For instance zirconium sulphate solutions have been used, but difficulties have been encountered in the production and treatment thereof and only a poor yield of crystallized zirconium oxychloride from chloride solutions (which has the advantage of supplying a product having well formed crystals, and enables a good purification) has been produced. However, the treatment of hydrochloric acid solutions necessary with the said method, on an industrial scale, may seriously injure the apparatus.

The difficulties encountered in using sulphuric acid solutions, which are industrially much easier to manipulate than hydrochloric acid solutions, are not due to difficulties in the attack of the ore and to the preparation of the solutions, but to the absence of a good method for recovering the zirconium compounds contained in such solution under sufficiently advantageous conditions, as well at an economical standpoint as to that of the quality of the products obtained.

The methods proposed have indeed difficulties which restrain their use, either that the degree of purification obtained is not sufficient or that the yields are poor. In these processes too much time was required for reaching equilibrium, or the nature of the precipitates obtained was such as to prevent an easy recovery of the zirconium compound, and an easy washing was not possible.

The present invention has for its object a method for obtaining industrially pure zirconium compounds from sulphuric solutions which can avoid the said disadvantages.

The applicant has discovered that when operating under given conditions of $ZrO_2$, $Na_2O$ and $SO_3$ concentration in the solution and of temperature, it is possible to separate zirconium by crystallization with good yields, in the form of double zirconium and sodium sulphates giving well formed crystals, these crystals being easy to collect and to wash, and that said crystallization enables an excellent purification of zirconium compounds all in one operation through elimination of the mother liquor.

According to the proportion of sulphuric acid in excess in the mother-liquor of the crystallization, either one of two salts (A or B) can be crystallized out (or often one of these accompanied by a little of the other), as explained below, these salts having approximately the following formulas:

Salt A: $Zr(SO_4)_2.Na_2SO_4.4H_2O$ and

Salt B: $ZrO.SO_4.0.75Na_2SO_4.H_2O$

Salt A seems to be the most advantageous to obtain in carrying out the process, both from the standpoint of its low solubility in a medium having a sufficient sulphuric acid concentration and also owing to its good crystallization and to the higher yields obtainable.

These two crystallized salts, are both believed to be new substances, composed of zirconium sulphate and sodium sulphate with water of crystallization. The ratio of zirconium to sodium in these is different.

Salt A contains one zirconium atom to two sodium atoms (which is equivalent to the ratio 2Zr to 4Na (atoms) in the form of a crystalline double salt).

Salt B contains the ratio of 4Zr to $3Na_2$ or 4Zr to 6Na (which is equivalent to the ratio of 2Zr to 3Na).

Both of these salts are different from any mixture of crystallized $Zr(SO_4)_2.4H_2O$ with $Na_2SO_4$, which differences are manifest by the different crystal form, angles of the crystals, X-ray pattern, and by numerous other differences.

Mixtures of salt A and salt B are formed, as indicated by the dotted parts of the curves in the drawing.

It is already known that zirconium gives with potassium, double sulphates of low solubility and that it can give with sodium much more soluble double sulphates but none of the previously described salts corresponds, even approximately, to either of the above formulae and the herein described conditions of formation of the double zirconium and sodium salts, well crystallized and only little soluble, as well as their low solubility in a convenient medium, have not been heretofore described nor precisely stated in a manner to enable their industrial production and use.

The investigation of the conditions for carrying out the crystallization of both said salts enabled the applicant to determine with sufficient accuracy, the sulphuric acid concentrations corresponding to their formation. The accompanying drawing shows, for a temperature approaching the boiling point:

1. The curve A of crystallization of the first of the said double salts (salt A).

2. The curve B of crystallization of the second of said salts (salt B).

It can be seen that said curves meet in an intersection P which is characteristic of the passage of one of said salts in to the other and which corresponds to molecular poportions (in the solution) of 6SO₃ for 1ZrO₂, the crystallization takes place in a liquid having an SO₃ concentration (in the solution) of about 30%.

However, some false states of equilibrium easily occur around the said point P, leading to the separation of one of the said salts in the field of existence of the other as is shown in the dotted part of the curves.

The crystallized zirconium and sodium double salts having compositions approaching of

$Zr(SO_4)_2.Na_2SO_4.4H_2O$ and $ZrO.SO_4.0.75Na_2SO_4.H_2O$, and which will be hereinafter more completely described, thus constitute new industrial products and as such, also form an object of the invention.

Starting from impure zirconium compounds such as ores, the method which forms the object of the invention practically consists in preparing a solution containing $ZrO_2$, $Na_2O$ and $SO_3$ in the molecular ratio hereinafter defined, and, after filtering out the insoluble compounds such as silica, causing crystallization of the double zirconium and sodium sulphates, by concentrating said solution by hot evaporation then separating the crystallized salt from its mother-liquor.

The said process can be applied industrially in a particularly advantageous way in the case in which, as for instance in the treatment of zircon, the zirconium ore is, for making it more readily attacked by sulphuric acid, previously fritted with sodium carbonate, as is well known. By subsequent treatment with sulphuric acid, and dissolution, the solution obtained then effectively contains the sodium sulphate necessary for obtaining the double salt.

The amount of sodium sulphate present in the solution must be at least approximately equal to the amount used for the formation of the desired double salt. It will thus be at least in the ratio of 0.60 molecule of $Na_2SO_4$ per molecule of $ZrO_2$ compound in solution, i. e. slightly smaller than the ratio which corresponds to the formation of the salt B. It can however be substantiatally higher, without any other disadvantage than that of possible diluting the zirconium sulphate content of the salt formed due to the introduction of an excess of sodium salts. The preferred proportions are advantageously comprised between 1 and 1.75 molecules of $Na_2SO_4$ for each molecule of $ZrO_2$ in compound solution.

The amounts of sulphuric acid used will have to be chosen in order to obtain the best conditions for effecting the crystallization of the one of the double salts it is desired to obtain.

Thus for obtaining the salt A, the amount of total SO₃ in the solution will be between 3 and 10 molecules of SO₃ per molecule of $ZrO_2$ compound and preferably about 4 to 6 molecules; crystallization will then take place at concentrations between 30% and 45% of total SO₃ in the solution.

For obtaining the salt B, the total SO₃ in the solution will be between 2.3 (of which at least 1.7 after deduction of the sodium sulphate present) and 6 molecules of SO₃ per molecule of $ZrO_2$ compound and preferably about 2.5 to 4.5 molecules; the crystallization will then be produced at concentrations between 20 percent and 33 percent of total SO₃ in the solution.

In speaking of the total SO₃ in the solution, this of course means the SO₃ which is in combination with sodium, the SO₃ which is in combination with the zirconium and the SO₃ which is in the form of free sulphuric acid.

The said acid may be added at various steps of the process, as for instance during the stage of making the solution from the fritted ore, or during evaporation. The method which is most advantageous industrially in the case of salt A is of using, as such additional acid, the mother liquor remaining after the crystallization in a preceding operation if its purity is sufficient. A theoretically perfect cyclic process is thus obtained, since, in the double salt obtained the components $ZrO_2.Na_2O$ and $SO_3$ are in just the relative proportions in which they are introduced in the manufacture when starting with a zircon fritted with sodium carbonate in equimolecular amount and dissolving it in the amount of sulphuric acid necessary for effecting solution.

The yield in zirconium obtained as double salt in industrially pure state will then be, theoretically, 100 percent based on the amount of zirconium solubilized in the fritted material.

The crystallization of the salt takes place (or at least commences) in hot solutions.

Owing to supersaturation phenomena, crystallization generally begins with some delay, especially in the case of salt B; and in the neighbourhood of the transition point, the crystallization of a mixture of the salts A and B usually results.

Filtration may be performed when cold, provided however that it will not be delayed until recrystallization has too much modified the crystals formed.

The following examples describe two embodiments of the invention, the scope of the invention not being restricted to these examples:

*Example 1*

Natural zircon ($ZrSiO_4$) is ground and fritted with an excess of sodium carbonate until practically complete decomposition has been accomplished. The product obtained is washed with water for eliminating the excess of sodium salts and a product (the undissolved residue) is obtained having a composition which corresponds substantially to that of a sodium silicozirconate: $ZrO_2.SiO_2.Na_2O$.

By treating this product with an amount of sulphuric acid needed for dissolving both the sodium and zirconium, and after eliminating the separated silica by filtration, a solution is obtained which contains:

| | Molecular ratio |
|---|---|
| $ZrO_2$, 120 gr./l | 1 |
| $Na_2O$, 60 gr./l | 1 |
| $SO_3$, 240 gr./l | 3.1 |

In the above table and elsewhere throughout this case, "gr./l" is intended to mean "grammes per liter."

To 1,000 litres of such solution is added 156 kg. of sulphuric acid of 66° Bé. (i. e. 130 grammes of said acid for each 100 grammes of $ZrO_2$ in solution), thus bringing to about 4.65 the molecular ratio of SO₃ to $ZrO_2$ then the said solution was concentrated by heating until its boiling point reached about 120° C., and then the mass was cooled to room temperature. Thus were obtained well formed crystals and a mother-liquor that was easily eliminated by centrifugation and washing (washing was performed by means of a solution of sulphuric acid and sodium sulphate of a concentration approaching that of the mother-liquor as to these two components). The compositions of the crystals and of the mother-liquor are given in the following table.

|  | Crystals | | Mother-Liquor | |
| --- | --- | --- | --- | --- |
|  | contents | molecular ratio | contents | molecular ratio |
| ZrO₂ | Per cent 25.3 | 1 | 17.1 gr./l | 1 |
| Na₂O | 11.4 | 0.9 | 25.1 gr./l | 2.9 |
| SO₃ | 48.2 | 2.94 | 506 gr./l | 45 |
| TiO₂/ZrO₂ | 0.05 | | 96.5 per cent | |
| Fe/ZrO₂ | 0.01 | | 17.5 per cent | |

The yield of zirconium being crystallized was near 95 percent of the total Zr in the solution. The said analyses show that almost the whole of the impurities (titanium compounds and iron compounds) were retained in the mother-liquors, and that the salt obtained in such crystallization has a composition approaching:

$$Zr(SO_4)_2.Na_2SO_4.4H_2O$$

The microscopical investigation of the salt showed that it was not a mixture of zirconium sulphate and sodium sulphate, but a practically homogeneous product, formed of truncated prisms, having an angle of 120°.

The determination of the refractive index by immersion gave values between 1.50 and 1.58 as well as the examination of the diffraction diagram by means of X-rays, led to the same conclusion.

The mother-liquor contained a great excess of free sulphuric acid, a necessary condition for the formation of salt obtained, as was previously explained.

*Example 2*

As in Example 1, zircon was fritted with sodium carbonate, washed as in Example 1, then after reaction with sulphuric acid and elimination of the silica, a solution was obtained containing:

| | | Molecular ratio |
| --- | --- | --- |
| ZrO₂, 136 gr./l | | 1 |
| Na₂O, 69 gr./l | | 1 |
| SO₃, 245 gr./l | | 2.78 |

2 litres of said solution were evaporated to half the initial volume. During the said operation, a plentiful crystallization was observed. After cooling to room temperature, filtration and washing, on the one hand 730 grs. of crystals weighed in wet state and on the other hand 630 ccm. of mother-liquors were obtained, of which the compositions are given in the following table (after deduction of the adhering mother-liquor in the case of crystals).

|  | Crystals | | Mother-Liquor | |
| --- | --- | --- | --- | --- |
|  | contents | molecular ratio | contents | molecular ratio |
| ZrO₂ | Per cent 37.2 | 1 | 103 gr./l | 1 |
| Na₂O | 14.6 | 0.77 | 97 gr./l | 1.86 |
| SO₃ | 43.7 | 1.82 | 370 gr./l | 5.5 |
| TiO₂/ZrO₂ | 0.23 | | 10.8 per cent | |
| Fe/ZrO₂ | 0.02 | | 1.4 per cent | |

The fraction of zirconium crystallized was, in this case, about 76 percent of the total zirconium in the solution. The above analyses show that the purification was good and that the salt obtained has a composition approaching that of:

$$ZrO.SO_4.0.75Na_2SO_4.H_2O$$

This salt, like that obtained in Example 1, is not a mixture, its refractive index approaches that of the salt already described, and its diffraction pattern under X-rays examination is also quite characteristic.

The above examples are naturally not to be taken in a limitive sense. For instance the concentration of the initial solution may be varied, according to the amounts of the several substances used for its preparation. On the other hand, however it is advantageous from an economical standpoint to prepare the double sulphates described by starting from zirconium ores fritted with sodium carbonate, but it is possible to produce them in other ways. The invention also applies to the preparation of these double salts from any impure zirconium compound.

In the appended claims the expression "the total sulphate content calculated as SO₃" is intended to include free sulphuric acid and the compounds of sulphuric acid (e. g. sulphates) which may be present in such solution. The sulphate and the sulphuric acid are both calculated as SO₃, the anhydride of sulphuric acid.

I claim:

1. Method for industrially obtaining pure zirconium compounds from zirconium ores which comprises fritting the said zirconium ore with sodium carbonate, treating the fritted product with sulphuric acid, eliminating insoluble substances from the resulting solution, adjusting the sulphuric acid content of such solution so that the proportion of sodium sulphate is, by analyses, at least 0.60 molecule per molecule of dissolved ZrO₂ compound present and the total proportion of SO₃ being by analysis 2.3 to 10 molecules per molecule of dissolved ZrO₂ compound present and at least 1.7 after deduction of the SO₃ content of the sodium sulfate present, causing a crystallization in the solution by a method which involves concentrating said solution while hot so as to bring the mother liquor to a concentration of 20 percent to 45 percent of SO₃ by analysis, and separating from the mother-liquor the double zirconium sodium sulfate thus crystallized.

2. Method of making double sulphate of sodium and zirconium consisting in fritting zircon with sodium carbonate, treating the fritted product with sulphuric acid, eliminating insoluble substances from the resulting liquor, adjusting the sulphuric acid content so as to bring the composition of the solution to 2.3 to 10 molecules of total SO₃ per molecule of ZrO₂ and at least 1.7 after deduction of the SO₃ content of the sodium sulphate, causing a crystallization in the solution by concentrating with the aid of heat so as to bring the mother-liquor to a concentration of between 20% and 45% of SO₃ by analysis, and separating the mother-liquor and the crystallized double zirconium and sodium sulphate salts from each other.

3. A method according to claim 1, in which the solution of the fritted zirconium ore in sulphuric acid is adjusted to contain, by analysis, about 1 to about 1.75 moles of Na₂SO₄ per mole of ZrO₂ compound in solution.

4. Method according to claim 1, in which the crystallization of the double zirconium-sodium sulphate is effected in a mother-liquor having a total sulphate content, calculated as SO₃, between 20% and 33%, to crystallize a double salt having the composition ZrO.SO₄.0.75Na₂SO₄.H₂O.

5. Method of producing a crystallized double sulphate of zirconium and sodium, consisting in fritting zircon with sodium carbonate, treating the fritted product with sulphuric acid, eliminating insoluble substances from the resulting liquor, adjusting the sulphuric acid content of the solution to a concentration capable of depositing crystals of a double salt containing $ZrO_2$, $Na_2O$ and $SO_3$ all combined together, crystallizing by hot evaporation, and separating the mother-liquor and the crystals formed, from each other.

6. A method according to claim 1, in which the sulphate content of the solution is brought to between 2.3 and $6SO_4$ radicals for each Zr atom for containing a double salt having a composition approximately $ZrO.SO_4.0.75Na_2SO_4.H_2O$.

7. A method according to claim 1, in which the sulphate content of the solution is brought to between 3 and $10SO_4$ radicals for each Zr atom in the solution for obtaining a double salt having a composition approximately $$Zr(SO_4)_2.Na_2SO_4.4H_2O$$

8. A method according to claim 1, in which the total sulphate radical in the mother-liquor in which the crystallization of the double zirconium-sodium salt is to be effected is about 30% to about 45%, calculated as $SO_3$ to crystallize a double salt having approximately the composition $Zr(SO_4)_2.Na_2SO_4.4H_2O$.

9. A method according to claim 1, in which the total sulphate content of the solution is between 2.5 and $4.5SO_4$ radicals per 1 atom of Zr for obtaining a double salt having a composition approximately $ZrO.SO_4.0.75Na_2SO_4.H_2O$.

10. A method according to claim 1, in which the total sulphate content of the solution is between 4 and $6SO_4$ radicals per 1Zr atom, for obtaining a double salt having a composition approximately $Zr(SO_4)_2.Na_2SO_4.4H_2O$.

11. A crystallized double zirconium and sodium sulphate having a composition approximately $Zr(SO_4)_2.Na_2SO_4.4H_2O$, the crystals having the form of truncated prisms of an angle about 120° and having a refractive index determined by immersion, between 1.50 and 1.58, and this crystallized double salt having an X-ray diffraction pattern which is definitely different from that of any mechanical mixture of crystallized zirconium sulphate and crystallized sodium sulphate.

12. A crystallized double zirconium sulphate, having a composition approximately $$ZrO.SO_4.0.75Na_2SO_4.H_2O$$

having a refractive index determined by immersion, between 1.50 and 1.58, and this crystallized double salt having an X-ray diffraction pattern which is definitely different from that of any mechanical mixture of crystallized zirconium sulphate and crystallized sodium sulphate.

13. Method of industrially obtaining pure zirconium compounds from zirconium ores which comprises fritting the said zirconium ore with sodium carbonate, treating the fritted product with sulphuric acid, eliminating insoluble substances from the resulting solution, adjusting the sulphuric acid content of such solution so that the proportion of sodium sulphate is, by analysis, at least 0.60 molecule per molecule of dissolved $ZrO_2$ compound present and the total proportion of $SO_3$ being by analysis 2.3 to 10 molecules per molecule of dissolved $ZrO_2$ compound present and at least 1.7 after deduction of the $SO_3$ content of the sodium sulfate present, causing a crystallization in the solution by a method which involves concentrating said solution while hot so as to bring the mother-liquor to a concentration of 20 percent to 45 percent of $SO_3$ by analysis, cooling the concentrated solution to cause crystallization of a double sulphate of sodium and zirconium, and separating from the mother-liquor the double zirconium sodium sulfate thus crystallized.

14. A crystallized double sulphate of zirconium and sodium containing per two atoms of Zr, at least approximately three atoms and not substantially over four atoms of sodium, such salt having a refractive index, determined by immersion, between 1.50 and 1.58, and having a diffraction diagram, determined by X-ray examination, different from that of any mixture of crystallized zirconium sulphate and crystallized sodium sulphate.

15. A cyclic method of preparing a double sulphate of sodium and zirconium, from a zirconium ore, which comprises fritting such ore with sodium carbonate in amount somewhat in excess over that which is molecularly equivalent to all of the zircon present, dissolving the frit in sulphuric acid in amount necessary to dissolve substantially all of the zirconium and sodium in the frit, adding to the solution the acid mother-liquor coming from crystallization of a preceding batch as set forth hereinbelow, separating insolubles from the solution, concentrating the acid solution by heat, and crystallizing a double sodium-zirconium sulphate from the hot solution, recovering the mother-liquor for adding to the solution in a subsequent run of the process, to form an entirely cyclic process.

16. A cyclic method of preparing a double sulphate of sodium and zirconium, from a zircon ore, which comprises fritting such ore with sodium carbonate in amount somewhat in excess over that which is molecularly equivalent to the zircon, leaching out the water solubles from said fritted material, dissolving the frit in sulphuric acid in amount necessary to dissolve substantially all the zirconium and sodium in the leached frit, then adding the mother-liquor coming from crystallization in an earlier run of the process as stated below, separating insolubles from the solution, concentrating the acid solution by heat, and crystallizing a double sodium-zirconium sulphate from the hot solution, separating such crystals from the mother liquor and recovering the mother liquor for adding to the solution in a subsequent run of the process, to form an entirely cyclic process.

MARCEL KASTNER.

REFERENCES CITED

The following references are of record in the file of this patent:

UNITED STATES PATENTS

| Number | Name | Date |
| --- | --- | --- |
| 1,530,139 | Ryan | Mar. 17, 1925 |
| 1,618,287 | Kinzie | Feb. 22, 1927 |

OTHER REFERENCES

Mellor: "Inorganic and Theoretical Chemistry," vol. 7, page 159. Published by Longmans, Green and Co., London (1927).